United States Patent
Kim et al.

(10) Patent No.: US 11,339,288 B2
(45) Date of Patent: May 24, 2022

(54) PHOTOCURABLE COMPOSITION AND COATING LAYER INCLUDING CURED PRODUCT THEREOF

(71) Applicant: LG Chem, Ltd., Seoul (KR)

(72) Inventors: Sang Hwan Kim, Daejeon (KR); Sle Lee, Daejeon (KR); Jang Soon Kim, Daejeon (KR); Kwang Su Seo, Daejeon (KR)

(73) Assignee: LG Chem, Ltd.

( * ) Notice: Subject to any disclaimer, the term of this patent is extended or adjusted under 35 U.S.C. 154(b) by 107 days.

(21) Appl. No.: 16/762,337

(22) PCT Filed: Nov. 6, 2018

(86) PCT No.: PCT/KR2018/013354
§ 371 (c)(1),
(2) Date: May 7, 2020

(87) PCT Pub. No.: WO2019/093731
PCT Pub. Date: May 16, 2019

(65) Prior Publication Data
US 2020/0339809 A1 Oct. 29, 2020

(30) Foreign Application Priority Data
Nov. 10, 2017 (KR) .................. 10-2017-0149538

(51) Int. Cl.
*C08L 75/12* (2006.01)
*C09D 175/12* (2006.01)
(Continued)

(52) U.S. Cl.
CPC .............. *C08L 75/12* (2013.01); *C08G 18/12* (2013.01); *C08G 18/5039* (2013.01);
(Continued)

(58) Field of Classification Search
CPC ........ C08L 75/12; C08L 75/16; C09D 175/12; C09D 175/16
See application file for complete search history.

(56) References Cited

U.S. PATENT DOCUMENTS

2008/0233392 A1* 9/2008 Tanaka ................. C08G 18/672
428/345
2009/0123746 A1* 5/2009 Tanaka .................. C09J 175/16
428/355 AC
(Continued)

FOREIGN PATENT DOCUMENTS

EP 1247843 A2 10/2002
JP 2004352781 A 12/2004
(Continued)

OTHER PUBLICATIONS

International Search Report for Application No. PCT/KR2018/013354 dated Mar. 13, 2019, 2 pages.

*Primary Examiner* — Michael L Leonard
(74) *Attorney, Agent, or Firm* — Lerner, David, Littenberg, Krumholz & Mentlik, LLP (57) ABSTRACT

A photocurable composition is provided. The photocurable composition includes: a urethane acrylamide oligomer derived from a first urethane prepolymer having an isocyanate end group and a polar group-containing acrylamide; a urethane acrylate oligomer derived from a second urethane prepolymer having an isocyanate end group and a polar group-containing (meth)acrylate; and an amide group-containing acrylic polymer derived from acrylamide and a polar group-containing (meth)acrylate.

13 Claims, 2 Drawing Sheets (51) Int. Cl.
 *C08G 18/12* (2006.01)
 *C08G 18/50* (2006.01)
 *C08G 18/62* (2006.01)
 *C08L 75/16* (2006.01)
 *C09D 175/16* (2006.01)

(52) U.S. Cl.
 CPC ..... *C08G 18/6225* (2013.01); *C08G 18/6266* (2013.01); *C08L 75/16* (2013.01); *C09D 175/12* (2013.01); *C09D 175/16* (2013.01)

(56) References Cited

U.S. PATENT DOCUMENTS

2014/0303330 A1 10/2014 Kanagawa et al.
2018/0244832 A1* 8/2018 Takenouchi ......... C08G 18/758

FOREIGN PATENT DOCUMENTS

| JP | 2007070618 A | 3/2007 |
|---|---|---|
| JP | 200845032 A | 2/2008 |
| JP | 2011157419 A | 8/2011 |
| KR | 101009998 B1 | 1/2011 |
| KR | 20130140537 A | 12/2013 |
| KR | 20140000628 A | 1/2014 |
| KR | 20140012623 A | 2/2014 |
| KR | 20150097937 A | 8/2015 |
| KR | 20170001806 A | 1/2017 |

* cited by examiner

Figure 2B ent application is a national stage entry under 35 U.S.C. § 371 of International Application No. PCT/KR2018/013354 filed on Nov. 6, 2018, which claims priority to Korean Patent Application No. 10-2017-0149538 filed in the Korean Intellectual Property Office on Nov. 10, 2017, the entire contents of which are incorporated herein by reference in their entirety.

PHOTOCURABLE COMPOSITION AND COATING LAYER INCLUDING CURED PRODUCT THEREOF

CROSS-REFERENCE TO RELATED APPLICATIONS

The present application is a national stage entry under 35 U.S.C. § 371 of International Application No. PCT/KR2018/013354 filed on Nov. 6, 2018, which claims priority to Korean Patent Application No. 10-2017-0149538 filed in the Korean Intellectual Property Office on Nov. 10, 2017, the entire contents of which are incorporated herein by reference in their entirety.

TECHNICAL FIELD

The present invention relates to a photocurable composition and a coating layer including a cured product thereof.

BACKGROUND ART

A deco film as an interior finishing material is attached to a target product, and thus is used to make the quality of the product high quality, protect the product, or make the product an eco-friendly product. Such a deco film is used in various fields such as various furniture such as a chest of drawers, a sink or table, and electronic products such as a washing machine, a refrigerator, an audio system or a television set. Also, in terms of an aesthetic sense of the product, various patterns such as a tree pattern, a hair line pattern, and an SUS pattern can be formed on the deco film.

Recently, various furniture and electronic products having curved shapes have appeared, and the demand for a deco film attached to bent products tends to increase. Glass with transparency is usually used as a substrate of a deco film in the related art, but when a decoration pattern is printed directly on a curved surface of glass, the defective rate is high, so that recently, deco films which create metal sensitivity and various patterns with transparent films on a plastic substrate such as polyethylene terephthalate (PET) have been on the market.

However, there occurs a problem in that a transparent film is peeled off from a plastic substrate in a short period of time after a deco film is attached to a bent product. Further, when a product to which a deco film is attached is used under high temperature or high humidity conditions, there is a problem in that a transparent film falls off from a plastic substrate.

Thus, there is a need for a technology capable of producing a deco film in which adhesion to a bent product is excellent, a transparent film of the deco film is not peeled off from a substrate even after the deco film is attached to the bent product, and deformation does not occur under severe conditions such as high temperature and high humidity.

DETAILED DESCRIPTION OF THE INVENTION

Technical Problem

The present specification has been made in an effort to provide a photocurable composition and a coating layer including a cured product thereof.

However, a problem to be solved by the present invention is not limited to the aforementioned problem, and the other problems that are not mentioned may be clearly understood by a person skilled in the art from the following description.

Technical Solution

An exemplary embodiment of the present invention provides a photocurable composition including: a urethane acrylamide oligomer derived from a first urethane prepolymer having an isocyanate end group and a polar group-containing acrylamide; a urethane acrylate oligomer derived from a second urethane prepolymer having an isocyanate end group and a polar group-containing (meth)acrylate; and an amide group-containing acrylic polymer derived from acrylamide and a polar group-containing (meth)acrylate.

Another exemplary embodiment of the present invention provides a coating layer including a cured product of the photocurable composition.

Advantageous Effects

According to an exemplary embodiment of the present invention, it is possible to provide a deco film in which a coating layer including a cured product of a photocurable composition is easily attached to an article having curved shapes and the form of the deco film may be maintained for a long period of time even after the deco film is attached to a bent article.

According to an exemplary embodiment of the present invention, the photocurable composition can provide a coating layer which is suppressed from being deformed in a high temperature environment.

According to an exemplary embodiment of the present invention, a deco film including a coating layer is excellent in adhesion to a bent article, and can maintain the form thereof for a long period of time even after being attached to the bent article.

According to an exemplary embodiment of the present invention, a deco film including a coating layer can maintain the form thereof even under high temperature and high humidity conditions.

BEST MODE

Throughout the specification of the present application, when one part "includes" one constituent element, unless otherwise specifically described, this does not mean that another constituent element is excluded, but means that another constituent element may be further included.

Throughout the specification of the present application, when one member is disposed "on" another member, this includes not only a case where the one member is brought into contact with another member, but also a case where still another member is present between the two members.

Throughout the specification of the present application, the unit "part by weight" may mean a weight ratio between the respective components.

Throughout the specification of the present application, "(meth)acrylate" is used to collectively refer to acrylate and methacrylate.

Throughout the specification of the present application, a prepolymer may mean a polymer in which polymerization occurs between compounds to some degree, and may mean a polymer which does not reach a completely polymerized state and can be additionally polymerized.

Throughout the specification of the present application, a polymerization unit derived from compounds may mean a form in which a polymerization reaction proceeds between the compounds to form a framework of the polymer, for example, a main chain or a side chain.

Throughout the specification of the present application, "a weight average molecular weight" and "a number average molecular weight" of a compound may be calculated by using a molecular weight and a molecular weight distribution of the compound. Specifically, a sample specimen in which a concentration of a compound is 1 wt % is prepared by putting tetrahydrofuran (THF) and the compound into a 10-ml glass bottle, a standard specimen (polystyrene) and the sample specimen are filtered through a filter (pore size of 0.45 mm), and then the elution time of the sample specimen is compared with the calibration curve of the standard specimen by injecting the specimens into a GPC injector, thereby obtaining the molecular weight and the molecular weight distribution of the compound. In this case, Infinity II 1260 (manufactured by Agilent Inc.) may be used as a measuring apparatus, and the flow rate and the column temperature may be set to 1.00 mL/min and 40.0° C., respectively.

Throughout the specification of the present application, the viscosity of the compound may be a value measured by a Brookfield viscometer at a temperature of 25° C.

The present inventors discovered a composition of a photocurable composition capable of implementing a coating layer of a deco film which is easily attached to a target article having curved shapes and can maintain a form attached to the article for a long period of time, and discovered a composition of a photocurable composition capable of implementing a coating layer which is not deformed even in a high temperature and high humidity environment, thereby developing a photocurable composition as described below and a coating layer including a cured product of the photocurable composition.

Hereinafter, the present specification will be described in more detail.

An exemplary embodiment of the present invention provides a photocurable composition including: a urethane acrylamide oligomer derived from a first urethane prepolymer having an isocyanate end group and a polar group-containing acrylamide; a urethane acrylate oligomer derived from a second urethane prepolymer having an isocyanate end group and a polar group-containing (meth)acrylate; and an amide group-containing acrylic polymer derived from acrylamide and a polar group-containing (meth)acrylate.

According to an exemplary embodiment of the present invention, it is possible to provide a deco film in which a coating layer including a cured product of a photocurable composition is easily attached to an article having curved shapes and the form of the deco film may be maintained for a long period of time even after the deco film is attached to a bent article. Further, the photocurable composition can provide a coating layer which is suppressed from being deformed in a high temperature environment.

According to an exemplary embodiment of the present invention, the urethane acrylamide oligomer may be derived from a first urethane prepolymer having an isocyanate end group and a polar group-containing acrylamide. That is, the urethane acrylamide oligomer may be formed through a polymerization reaction between the first urethane prepolymer and the polar group-containing acrylamide. Specifically, an isocyanate group located at the end of the first urethane prepolymer reacts with a polar group of the polar group-containing acrylamide, and as a result, the urethane acrylamide oligomer may be formed. More specifically, each polar group of the two acrylamides may react with each isocyanate group located at both ends of the first urethane prepolymer, thereby forming the urethane acrylamide oligomer.

According to an exemplary embodiment of the present invention, the photocurable composition including the urethane acrylamide oligomer can easily implement a coating layer which is excellent in durability under high temperature and high humidity conditions.

According to an exemplary embodiment of the present invention, a polar group of the polar group-containing acrylamide forming the urethane acrylamide oligomer may include a hydroxyl group (—OH). In terms of polymerization reactivity with an isocyanate group located at the end of the first urethane prepolymer, an acrylamide containing a hydroxyl group as a polar group can be used. The acrylamide containing a hydroxyl group as a polar group may form a urethane bond by reacting with an isocyanate group located at the end of the first urethane prepolymer. The urethane acrylamide oligomer has a high curing rate by UV due to a high polarity, and a cured product of the photocurable composition including the urethane acrylamide oligomer may be excellent in adhesion to an adherend.

According to an exemplary embodiment of the present invention, the polar group-containing acrylamide may not contain a carboxyl group. That is, the acrylamide may not contain a carboxyl group as a polar group. The carboxyl group contained in the acrylamide does not have good reactivity with an isocyanate group located at the end of the first urethane prepolymer, so that the urethane acrylamide oligomer may not be easily formed. In addition, by a carboxyl group remaining in a urethane acrylamide oligomer formed from a carboxyl group-containing acrylamide, there may occur a problem in that the heat-resistant adhesion of a coating layer including a cured product of the photocurable composition is reduced.

Accordingly, according to an exemplary embodiment of the present invention, the urethane acrylamide oligomer may be easily formed by using an acrylamide which does not contain a carboxyl group as a polar group. Furthermore, it is possible to provide a photocurable composition capable of forming a coating layer which is excellent in heat-resistant adhesion.

According to an exemplary embodiment of the present invention, the polar group-containing acrylamide may contain an alkyl group having 4 or less carbon atoms. Specifically, the polar group-containing acrylamide may contain at least one alkyl group of a methyl group, an ethyl group, a propyl group, and a butyl group. The photocurable composition including the urethane acrylamide oligomer derived from a polar group-containing acrylamide having an alkyl group having 4 or less carbon atoms and the first urethane prepolymer may implement a coating layer which is excellent in adhesion to a substrate even in a high temperature environment. That is, a deco film including a coating layer including a cured product of the photocurable composition may maintain the form thereof even under high temperature conditions.

According to an exemplary embodiment of the present invention, the polar group-containing acrylamide forming the urethane acrylamide oligomer may include at least one of a hydroxymethyl acrylamide, a hydroxyethyl acrylamide, a hydroxypropyl acrylamide, and a hydroxybutyl acrylamide.

According to an exemplary embodiment of the present invention, the first urethane prepolymer may be represented by the following Formula 1.

OCN-A-(-B$_1$-A-)$_n$-NCO  [Formula 1]

wherein,

A is derived from a diisocyanate-based compound,

B$_1$ is derived from a polycarbonate diol having a number average molecular weight of 200 g/mol to 700 g/mol, and n is an integer from 1 to 10.

According to an exemplary embodiment of the present invention, the first urethane prepolymer represented by Formula 1 may be formed through a polymerization reaction between the diisocyanate-based compound and the polycarbonate diol. Specifically, as a reaction between an isocyanate group of the diisocyanate-based compound and a hydroxyl group of the polycarbonate diol proceeds, a urethane bond may be formed, and a first urethane prepolymer having an isocyanate group at both ends thereof may be formed. A of Formula 1 may be derived from the diisocyanate-based compound, and B$_1$ may be derived from the polycarbonate diol. Specifically, A of Formula 1 may be derived from a framework excluding an isocyanate functional group from the diisocyanate-based compound, and B$_1$ of Formula 1 may be derived from a framework excluding a hydroxyl functional group from the polycarbonate diol.

According to an exemplary embodiment of the present invention, the first urethane prepolymer represented by Formula 1 may include 1 to 10 polymerization units having a structure. Specifically, the first urethane prepolymer may include 1 to 6, 3 to 6, or 5 to 10 polymerization units having a structure. A first urethane prepolymer having an appropriate weight average molecular weight may be formed by adjusting the number of the polymerization units having the structure included in the first urethane prepolymer to the above-described range. Specifically, the first urethane prepolymer may have a weight average molecular weight of 2,000 g/mol to 6,000 g/mol. By using the first urethane prepolymer having the above-described weight average molecular weight and the urethane acrylamide oligomer derived from the polar group-containing acrylamide, it is possible to provide a photocurable composition capable of implementing a coating layer which is excellent in durability even under high temperature and high humidity conditions.

When the first urethane prepolymer has a weight average molecular weight of less than 2,000 g/mol, there may occur a problem in that an elongation of a coating layer including a cured product of the photocurable composition is reduced. Further, when the first urethane prepolymer has a weight average molecular weight of more than 6,000 g/mol, there may occur a problem in that the coatability deteriorates because the viscosity of the photocurable composition is not easily adjusted, and the surface state of the applied photocurable composition is poor due to high polarity.

According to an exemplary embodiment of the present invention, the first urethane prepolymer may be produced by using an additive in addition to the diisocyanate-based compound and the polycarbonate diol. As the additive, a monomer for adjusting viscosity can be added. The first urethane prepolymer formed by using the monomer for adjusting viscosity may have an appropriate viscosity. Specifically, the first urethane prepolymer may have viscosity of 7,000 cPs to 9,000 cPs. It is possible to easily perform a polymerization reaction of the first urethane prepolymer having viscosity within the above-described range with the polar group-containing acrylamide. The viscosity of the first urethane prepolymer may be measured by a Brookfield viscometer using a No. 52 spindle at a temperature of 25° C. and a rotation speed of 10 rpm.

According to an exemplary embodiment of the present invention, the monomer for adjusting viscosity may include at least one of isobornyl acrylate (IBOA), isobornyl methacrylate (IBOMA), cyclohexyl methacrylate (CHMA), and trimethylcyclohexyl acrylate (TMCHA).

According to an exemplary embodiment of the present invention, the diisocyanate-based compound may include at least one of a bis(isocyanatomethyl)cyclohexane, methylene diphenyl diisocyanate, toluene diisocyanate, hexamethylene diisocyanate, isophorone diisocyanate, meta-xylene diisocyanate, dicyclohexylmethane diisocyanate, and tetramethyl xylene diisocyanate. However, the type of diisocyanate-based compound is not limited to those described above.

According to an exemplary embodiment of the present invention, the polycarbonate diol forming the first urethane prepolymer may have a number average molecular weight of 200 g/mol to 700 g/mol. Specifically, the polycarbonate diol may have a number average molecular weight of 300 g/mol to 600 g/mol, 350 g/mol to 550 g/mol, 400 g/mol to 500 g/mol, 250 g/mol to 400 g/mol, or 450 g/mol to 600 g/mol. By using the polycarbonate diol having a number average molecular weight within the above-described range, it is possible to provide a photocurable composition capable of implementing a coating layer which is excellent in durability even under high temperature and high humidity conditions.

According to an exemplary embodiment of the present invention, the polycarbonate diol may be a polyalkylene carbonate diol. Specifically, the polycarbonate diol may include one or more polyalkylene carbonate diols derived from at least one of polyethylene carbonate diol, polytrimethylene carbonate diol, polytetramethylene carbonate diol, poly(1,2-propylene carbonate) diol, poly(1,2-butylene carbonate) diol, poly(1,3-butylene carbonate) diol, poly(2,3-butylenecarbonate) diol, poly(1,2-pentylene carbonate) diol, poly(1,3-pentylene carbonate) diol, poly(1,4-pentylene carbonate) diol, poly(1,5-pentylene carbonate) diol, poly(2,3-pentylene carbonate) diol, poly(2,4-pentylene carbonate) diol, poly(1,6-hexylene carbonate) diol, and poly neopentyl carbonate diol.

According to an exemplary embodiment of the present invention, the urethane acrylate oligomer may be derived from a second urethane prepolymer having an isocyanate end group and a polar group-containing (meth)acrylate. That is, the urethane acrylate oligomer may be formed through a polymerization reaction between the second urethane prepolymer and the polar group-containing (meth)acrylate. Specifically, an isocyanate group located at the end of the second urethane prepolymer reacts with a polar group of the polar group-containing (meth)acrylate, and as a result, the urethane acrylate oligomer may be formed. More specifically, each polar group of the two (meth)acrylates may react with each isocyanate group located at both ends of the second urethane prepolymer, thereby forming the urethane acrylate oligomer.

According to an exemplary embodiment of the present invention, a photocurable composition including the urethane acrylate oligomer can implement a film which is excellent in adhesion to an article having curved shapes (hereinafter, referred to as bending adhesion). Furthermore, a coating layer including a cured product of a photocurable composition including a urethane acrylate oligomer may possess excellent elongation.

According to an exemplary embodiment of the present invention, a polar group of the polar group-containing (meth)acrylate forming the urethane acrylate oligomer may include a hydroxyl group (—OH). In terms of polymerization reactivity with an isocyanate group located at the end of the second urethane prepolymer, a (meth)acrylate containing a hydroxyl group as a polar group can be used. The (meth)acrylate containing a hydroxyl group as a polar group may form a urethane bond by reacting with an isocyanate group located at the end of the second urethane prepolymer. The urethane acrylate oligomer has a high curing rate by UV due to a higher polarity than that of a general acrylate oligomer, and a coating layer including a cured product of the photocurable composition including the urethane acrylate oligomer may be excellent in adhesion to a substrate.

According to an exemplary embodiment of the present invention, the polar group-containing (meth)acrylate may not contain a carboxyl group. That is, the (meth)acrylate may not contain a carboxyl group as a polar group. The urethane acrylate oligomer may be easily formed by using a (meth)acrylate which does not contain a carboxyl group as a polar group. In addition, by a carboxyl group remaining in a urethane acrylate oligomer formed from a carboxyl group-containing (meth)acrylate, there may occur a problem in that the heat-resistant adhesion of a coating layer including a cured product of the photocurable composition is reduced.

According to an exemplary embodiment of the present invention, the polar group-containing (meth)acrylate may contain an alkyl group having 4 or less carbon atoms. Specifically, the polar group-containing (meth)acrylate may contain at least one alkyl group of a methyl group, an ethyl group, a propyl group, and a butyl group. The photocurable composition including the urethane acrylate oligomer having a polymerization unit derived from a polar group-containing (meth)acrylate having an alkyl group having 4 or less carbon atoms and a second urethane prepolymer can provide a coating layer which is excellent in elongation.

That is, even when the deco film including the coating layer and the substrate is attached to an article having bent shapes, the coating layer may maintain a state of being attached to a substrate for a long period of time.

According to an exemplary embodiment of the present invention, the polar group-containing (meth)acrylate forming the urethane acrylate oligomer may include at least one of hydroxymethyl (meth)acrylate, hydroxyethyl (meth)acrylate, hydroxypropyl (meth)acrylate, and hydroxybutyl (meth)acrylate.

According to an exemplary embodiment of the present invention, the second urethane prepolymer may be represented by the following Formula 2.

wherein,

A is derived from a diisocyanate-based compound, $B_2$ is derived from a polycarbonate diol having a number average molecular weight of 1,000 g/mol to 3,000 g/mol, and n is an integer from 3 to 10.

According to an exemplary embodiment of the present invention, the second urethane prepolymer represented by Formula 2 may be formed through a polymerization reaction between the diisocyanate-based compound and the polycarbonate diol. Specifically, as a reaction between an isocyanate group of the diisocyanate-based compound and a hydroxyl group of the polycarbonate diol proceeds, a urethane bond may be formed, and a second urethane prepolymer having an isocyanate group at both ends thereof may be formed. A of Formula 2 may be derived from the diisocyanate-based compound, and $B_2$ may be derived from the polycarbonate diol. Specifically, A of Formula 2 may be derived from a framework excluding an isocyanate functional group from the diisocyanate-based compound, and $B_2$ of Formula 2 may be derived from a framework excluding a hydroxyl functional group from the polycarbonate diol.

According to an exemplary embodiment of the present invention, the second urethane prepolymer represented by Formula 2 may include 3 to 10 polymerization units having a structure. Specifically, the second urethane prepolymer may include 5 to 10, or 3 to 8 polymerization units having a structure. A second urethane prepolymer having an appropriate weight average molecular weight may be formed by adjusting the number of the polymerization units having the structure included in the second urethane prepolymer to the above-described range. Specifically, the second urethane prepolymer may have a weight average molecular weight of 9,500 g/mol to 11,000 g/mol.

By using the second urethane prepolymer having the above-described weight average molecular weight and the urethane acrylate oligomer derived from the polar group-containing (meth)acrylate, it is possible to provide a photocurable composition capable of implementing a coating layer which is excellent in bending adhesion. When the second urethane prepolymer has a weight average molecular weight of less out of the above-described range, there may occur a problem in that a tensile strength of a coating layer including a cured product of the photocurable composition is reduced.

According to an exemplary embodiment of the present invention, the second urethane prepolymer may be produced by using an additive in addition to the diisocyanate-based compound and the polycarbonate diol. As the additive, a monomer for adjusting the viscosity can be added. The second urethane prepolymer formed by using the monomer for adjusting viscosity may have an appropriate viscosity. Specifically, the second urethane prepolymer may have viscosity of 45,000 cPs to 55,000 cPs. It is possible to easily perform a polymerization reaction of the second urethane prepolymer having viscosity within the above-described range with the polar group-containing (meth)acrylate. The viscosity of the second urethane prepolymer may be measured by a Brookfield viscometer using a No. 52 spindle at a temperature of 25° C. and a rotation speed of 10 rpm.

According to an exemplary embodiment of the present invention, the monomer for adjusting viscosity may include at least one of isobornyl acrylate (IBOA), isobornyl methacrylate (IBOMA), cyclohexyl methacrylate (CHMA), and trimethylcyclohexyl acrylate (TMCHA).

According to an exemplary embodiment of the present invention, the diisocyanate-based compound may include at least one of a bis(isocyanatomethyl)cyclohexane, methylene diphenyl diisocyanate, toluene diisocyanate, hexamethylene diisocyanate, isophorone diisocyanate, meta-xylene diisocyanate, dicyclohexylmethane diisocyanate, and tetramethyl xylene diisocyanate. However, the type of diisocyanate-based compound is not limited to those described above.

The diisocyanate-based compound used to produce the second urethane prepolymer may be the same as or different from the diisocyanate-based compound used to produce the first urethane prepolymer.

According to an exemplary embodiment of the present invention, the polycarbonate diol forming the second urethane prepolymer may have a number average molecular weight of 1,000 g/mol to 3,000 g/mol. Specifically, the polycarbonate diol may have a number average molecular weight of 1,300 g/mol to 2,800 g/mol, 1,500 g/mol to 2,500 g/mol, 2,000 g/mol to 2,200 g/mol, 1,200 g/mol to 1,500 g/mol, 1,800 g/mol to 2,000 g/mol, 2,100 g/mol to 2,500 g/mol, or 2,800 g/mol to 3,000 g/mol. By using the polycarbonate diol having a number average molecular weight within the above-described range, it is possible to provide a photocurable composition capable of implementing a coating layer possessing improved elongation.

When the polycarbonate diol forming the second urethane prepolymer has a number average molecular weight of less than 1,000 g/mol, there may occur a problem in that the elongation of a coating layer to be produced is reduced. Further, when the polycarbonate diol has a number average molecular weight of more than 3,000 g/mol, the polycarbonate diol itself is crystallized, so that the second urethane prepolymer may not be easily produced.

According to an exemplary embodiment of the present invention, the polycarbonate diol may be a polyalkylene carbonate diol. Specifically, the polycarbonate diol may include one or more polyalkylene carbonate diols derived from at least one of polyethylene carbonate diol, polytrimethylene carbonate diol, polytetramethylene carbonate diol, poly(1,2-propylene carbonate) diol, poly(1,2-butylene carbonate) diol, poly(1,3-butylene carbonate) diol, poly(2,3-butylenecarbonate) diol, poly(1,2-pentylene carbonate) diol, poly(1,3-pentylene carbonate) diol, poly(1,4-pentylene carbonate) diol, poly(1,5-pentylene carbonate) diol, poly(2,3-pentylene carbonate) diol, poly(2,4-pentylene carbonate) diol, poly(1,6-hexylene carbonate) diol, and poly neopentyl carbonate diol.

According to an exemplary embodiment of the present invention, the amide group-containing acrylic polymer may be derived from the acrylamide and the polar group-containing (meth)acrylate. That is, the amide group-containing acrylic polymer may be formed through a polymerization reaction between the acrylamide and the polar group-containing (meth)acrylate. Specifically, a reaction between a carbon-carbon double bond contained in the acrylamide and a carbon-carbon double bond in the polar group-containing (meth)acrylate proceeds, and as a result, the amide group-containing acrylic polymer may be formed. As an example, the amide group-containing acrylic polymer may have a structure as in the following Formula 3.

[Formula 3]

According to an exemplary embodiment of the present invention, a photocurable composition including the amide group-containing acrylic polymer can implement a coating layer which is excellent in durability even under high temperature and high humidity conditions.

According to an exemplary embodiment of the present invention, a polar group of the polar group-containing (meth)acrylate forming the amide group-containing acrylic polymer may include a hydroxyl group (—OH). In terms of reactivity with the acrylamide, a (meth)acrylate containing a hydroxyl group as a polar group may be used.

According to an exemplary embodiment of the present invention, the polar group-containing (meth)acrylate may not contain a carboxyl group. That is, the (meth)acrylate may not contain a carboxyl group as a polar group. Since the carboxyl group contained in the (meth)acrylate does not have good reactivity with the acrylamide, the amide group-containing acrylic polymer may not be easily formed.

According to an exemplary embodiment of the present invention, the polar group-containing (meth)acrylate may contain an alkyl group having 4 or less carbon atoms. Specifically, the polar group-containing (meth)acrylate may contain at least one alkyl group of a methyl group, an ethyl group, a propyl group, and a butyl group. The photocurable composition including the amide group-containing acrylic polymer derived from a polar group-containing (meth)acrylate having an alkyl group having 4 or less carbon atoms and an acrylamide can provide a coating layer which is excellent in durability at high temperature.

According to an exemplary embodiment of the present invention, the polar group-containing (meth)acrylate forming the amide group-containing acrylic polymer may include at least one of hydroxymethyl (meth)acrylate, hydroxyethyl (meth)acrylate, hydroxypropyl (meth)acrylate, and hydroxybutyl (meth)acrylate.

According to an exemplary embodiment of the present invention, the acrylamide may include at least one of dimethyl acrylamide, ethyl methyl acrylamide, diethyl acrylamide, ethyl propyl acrylamide, dipropyl acrylamide, butyl propyl acrylamide, and dibutyl acrylamide.

According to an exemplary embodiment of the present invention, the amide group-containing acrylic polymer may be produced by using an additive in addition to acrylamide and a polar group-containing (meth)acrylate. The additive may include a molecular weight modifier, and the molecular weight modifier may include at least one of dodecane thiol, 2-mercaptoethanol, lauryl mercaptan, glycidyl mercaptan, 2-ethylhexylthioglycolate, and an alpha-methylstyrene dimer.

According to an exemplary embodiment of the present invention, by using the molecular weight modifier to produce the amide group-containing acrylic polymer, the weight average molecular weight of the amide group-containing acrylic polymer to be formed may be adjusted, and an amide group-containing acrylic polymer having an appropriate viscosity may be produced. Specifically, the viscosity of the amide group-containing acrylic polymer, measured by a Brookfield viscometer using a No. 52 spindle at a temperature of 25° C., may be 500 cPs to 1,000 cPs. In addition, the amide group-containing acrylic polymer may be produced as a solvent-free syrup having a solid content of 15% to 20%.

The coatability of a photocurable composition including the amide group-containing acrylic polymer may be improved by adjusting the viscosity of the amide group-containing acrylic polymer within the above-described range. Furthermore, the stability of the photocuring reaction of the photocurable composition may be improved.

Further, the polarity of the amide group-containing acrylic polymer may be adjusted by using an additive. Through this, the urethane acrylamide oligomer, the urethane acrylate oligomer, and the amide group-containing acrylic polymer, which are included in the photocurable composition, can be more easily mixed, and the photocuring reaction of the photocurable composition can be more easily performed.

According to an exemplary embodiment of the present invention, the content of the urethane acrylamide oligomer may be 10 parts by weight or more and 50 parts by weight or less with respect to 100 parts by weight of the photocurable composition. Specifically, the content of the urethane acrylamide oligomer may be 20 parts by weight or more and 40 parts by weight or less, 25 parts by weight or more and 35 parts by weight or less, 10 parts by weight or more and 25 parts by weight or less, 30 parts by weight or more and 40 parts by weight or less, or 45 parts by weight or more and 50 parts by weight or less with respect to 100 parts by weight of the photocurable composition.

According to an exemplary embodiment of the present invention, it is possible to produce a coating layer which is excellent in durability under high temperature conditions by adjusting the content of the urethane acrylamide oligomer included in the photocurable composition within the above-described range. In addition, it is possible to provide a coating layer capable of maintaining excellent adhesion even under high humidity conditions by adjusting the content of the urethane acrylamide oligomer included in the photocurable composition within the above-described range. When the content of the urethane acrylamide oligomer is less than 10 parts by weight with respect to 100 parts by weight of the curable composition, there may occur a problem in that adhesion of the coating layer to a substrate under high temperature and high humidity conditions deteriorates. Furthermore, when the content of the urethane acrylamide oligomer is more than 50 parts by weight with respect to 100 parts by weight of the curable composition, there may occur a problem in that the elongation of the coating layer deteriorates.

According to an exemplary embodiment of the present invention, the content of the urethane acrylate oligomer may be 10 parts by weight or more and 50 parts by weight or less with respect to 100 parts by weight of the photocurable composition. Specifically, the content of the urethane acrylate oligomer may be 10 parts by weight or more and 20 parts by weight or less, 30 parts by weight or more and 35 parts by weight or less, or 40 parts by weight or more and 50 parts by weight or less with respect to 100 parts by weight of the photocurable composition.

According to an exemplary embodiment of the present invention, the elongation is improved by adjusting the content of the urethane acrylate oligomer included in the photocurable composition within the above-described range, so that it is possible to provide a coating layer which is excellent in bending adhesion. Further, a coating layer which is excellent in bending adhesion can be easily produced by adjusting the content of the urethane acrylate oligomer within the above-described range.

When the content of the urethane acrylate oligomer is less than 10 parts by weight with respect to 100 parts by weight of the photocurable composition, there may occur a problem in that the bending adhesion of a coating layer including a cured product of the photocurable composition deteriorates. In addition, when the content of the urethane acrylate oligomer is more than 50 parts by weight with respect to 100 parts by weight of the photocurable composition, there may occur a problem in that the durability of the coating layer under high temperature and high humidity conditions deteriorates.

According to an exemplary embodiment of the present invention, the content of the amide group-containing acrylic polymer may be 2 parts by weight or more and 9 parts by weight or less with respect to 100 parts by weight of the photocurable composition. Specifically, the content of the amide group-containing acrylic polymer may be 3 parts by weight or more and 7 parts by weight or less, 4.5 parts by weight or more and 6 parts by weight or less, 3.5 parts by weight or more and 5 parts by weight or less, or 6 parts by weight or more and 7 parts by weight or less with respect to 100 parts by weight of the photocurable composition.

According to an exemplary embodiment of the present invention, it is possible to further improve the durability of the coating layer under high temperature conditions by adjusting the content of the amide group-containing acrylic polymer included in the photocurable composition within the above-described range.

Accordingly, according to an exemplary embodiment of the present invention, it is possible to easily produce a coating layer which is excellent in bending adhesion and in durability under high temperature and high humidity conditions by adjusting the contents of the urethane acrylamide oligomer, the urethane acrylate oligomer, and the amide group-containing acrylic polymer included in the photocurable composition within the above-described ranges.

According to an exemplary embodiment of the present invention, the urethane acrylamide oligomer may have a weight average molecular weight of 2,000 g/mol to 5,000 g/mol. Specifically, the urethane acrylamide oligomer may have a weight average molecular weight of 2,500 g/mol to 4,000 g/mol, 3,000 g/mol to 3,500 g/mol, 2,000 g/mol to 3,500 g/mol, or 4,000 g/mol to 5,000 g/mol. It is possible to produce a coating layer which is excellent in durability under high temperature and high humidity conditions by adjusting the weight average molecular weight of the urethane acrylamide oligomer within the above-described range.

When the urethane acrylamide oligomer has a weight average molecular weight of less than 2,000 g/mol, the elongation of a coating layer including a cured product of the photocurable composition is reduced, so that there is a problem in that cracks occur when the coating layer is exposed to high temperature. Furthermore, when the urethane acrylamide oligomer has a weight average molecular weight of more than 5,000 g/mol, there may occur a problem in that the coatability of the photocurable composition deteriorates.

According to an exemplary embodiment of the present invention, the urethane acrylate oligomer may have a weight average molecular weight of 10,000 g/mol to 15,000 g/mol. Specifically, the urethane acrylate oligomer may have a weight average molecular weight of 11,000 g/mol to 14,500 g/mol, 12,000 g/mol to 13,000 g/mol, 10,000 g/mol to 13,000 g/mol, or 13,500 g/mol to 15,000 g/mol. It is possible to improve the bending adhesion of a coating layer including a cured product of the photocurable composition by adjusting the weight average molecular weight of the urethane acrylate oligomer within the above-described range.

When the urethane acrylate oligomer has a weight average molecular weight of less than 10,000 g/mol, there may occur a problem in that an elongation of a coating layer including a cured product of the photocurable composition is reduced. Further, when the urethane acrylate oligomer has a weight average molecular weight of more than 15,000 g/mol, the viscosity of the photocurable composition is increased, so that there may occur a problem in that the coatability deteriorates, and a problem in that the tensile strength of a coating layer including a cured product of the photocurable composition is reduced.

According to an exemplary embodiment of the present invention, the amide group-containing acrylic polymer may have a weight average molecular weight of 5,000 g/mol to 10,000 g/mol. Specifically, the amide group-containing acrylic polymer may have a weight average molecular weight of 6,000 g/mol to 8,000 g/mol, 6,500 g/mol to 7,000 g/mol, 5,500 g/mol to 6,500 g/mol, 7,000 g/mol to 8,000 g/mol, or 8,500 g/mol to 9,500 g/mol. It is possible to further improve the durability of the coating layer under high temperature conditions by adjusting the weight average molecular weight of the amide group-containing acrylic polymer within the above-described range.

When the amide group-containing acrylic polymer has a weight average molecular weight of more than 10,000 g/mol, the compatibility of the amide group-containing acrylic polymer with the urethane acrylamide oligomer and the urethane acrylate oligomer rapidly deteriorates, so that there may occur a problem in that it is not easy to uniformly apply the photocurable composition.

According to an exemplary embodiment of the present invention, the viscosity of the urethane acrylamide oligomer, measured by a Brookfield viscometer using a No. 52 spindle at a temperature of 25° C. and a rotation speed of 10 rpm, may be 10,000 cPs to 15,000 cPs. Specifically, the viscosity of the urethane acrylamide oligomer may be 11,000 cPs to 14,000 cPs, 12,000 cPs to 13,000 cPs, 11,000 cPs to 13,000 cPs, or 13,500 cPs to 15,000 cPs.

According to an exemplary embodiment of the present invention, the viscosity of the urethane acrylate oligomer, measured by a Brookfield viscometer using a No. 52 spindle at a temperature of 25° C. and a rotation speed of 10 rpm, may be 50,000 cPs to 80,000 cPs. Specifically, the viscosity of the urethane acrylate oligomer may be 55,000 cPs to 75,000 cPs, 60,000 cPs to 70,000 cPs, or 65,000 cPs to 80,000 cPs.

According to an exemplary embodiment of the present invention, by adjusting the viscosities of the urethane acrylamide oligomer and the urethane acrylate oligomer within the above-described ranges, it is possible to improve the coatability of the photocurable composition and to more easily perform a photocuring reaction of the photocurable composition.

According to an exemplary embodiment of the present invention, the photocurable composition may further include an additive including at least one of a monomer for adjusting viscosity and a photoinitiator. It is possible to prevent the weight average molecular weight of the cured product of the photocurable composition from being rapidly increased by adding a monomer for adjusting viscosity as an additive to the photocurable composition. Furthermore, the coatability of the photocurable composition to a substrate may be improved by adding a monomer for adjusting viscosity to the photocurable composition to appropriately adjust the viscosity of the photocurable composition.

According to an exemplary embodiment of the present invention, the content of the monomer for adjusting viscosity may be 20 parts by weight or more and 40 parts by weight or less with respect to 100 parts by weight of the photocurable composition. Specifically, the content of the monomer for adjusting viscosity may be 25 parts by weight or more and 35 parts by weight or less, 20 parts by weight or more and 30 parts by weight or less, or 35 parts by weight or more and 40 parts by weight or less with respect to 100 parts by weight of the photocurable composition. By adjusting the content of the monomer for adjusting viscosity included in the photocurable composition within the above-described range, the viscosity of the photocurable composition may be controlled, thereby improving the coatability to a substrate.

According to an exemplary embodiment of the present invention, the monomer for adjusting viscosity may include at least one of pentaerythritol tri/tetraacrylate (PETA), tripropylene glycoldiacrylate (TPGDA), hexanediol diacrylate (HDDA), and butanediol diacrylate (BDDA).

According to an exemplary embodiment of the present invention, the viscosity of the photocurable composition, measured by a Brookfield viscometer using a No. 52 spindle at a temperature of 25° C., may be 300 cPs to 1,300 cPs. Specifically, the viscosity of the photocurable composition may be 300 cPs to 500 cPs, 600 cPs to 1,000 cPs, or 1,100 cPs to 1,250 cPs. The photocurable composition having viscosity within the above-described range may be excellent in coatability to a substrate.

According to an exemplary embodiment of the present invention, the content of the photoinitiator included as an additive in the photocurable composition may be 2 parts by weight or more and 5 parts by weight or less with respect to 100 parts by weight of the photocurable composition. The photocuring reaction of the photocurable composition can be effectively performed by adjusting the content of the photoinitiator included in the photocurable composition within the above-described range. A configuration publicly known as the photoinitiator can be used. In the present invention, it is possible to use at least one of HP-8 (manufactured by Miwon Specialty Chemical Co., Ltd.), CP-4 (manufactured by Miwon Specialty Chemical Co., Ltd.), Irgacure #1173 (manufactured by BASF), and Irgacure #184 (manufactured by BASF) as a photoinitiator.

According to an exemplary embodiment of the present invention, the photocurable composition may include other additives in addition to a monomer for adjusting viscosity and a photoinitiator. As an example, the photocurable composition may include other additives capable of improving an adhesion property of a cured product of the photocurable composition with a substrate.

The content of the other additives included in the photocurable composition may be 0.1 part by weight or more and 1 part by weight or less with respect to 100 parts by weight of the photocurable composition. The adhesion property of a cured product of a photocurable composition with a substrate can be improved by adjusting the content of the other additives included in the photocurable composition within the above-described range.

The other additives capable of improving the adhesion property of the cured product of the photocurable composition with a substrate may include at least one of epoxy silane, acrylate silane, and amino silane, but the types of the other additives are not limited thereto. As an example, KBM403 (manufactured by Shin-Etsu Chemical Co., Ltd.) may be used as the epoxy silane additive, and KBM5103 (manufactured by Shin-Etsu Chemical Co., Ltd.) may be used as an acrylate silane additive.

Another exemplary embodiment of the present invention provides a coating layer including a cured product of the photocurable composition.

According to an exemplary embodiment of the present invention, a coating layer including a cured product of the photocurable composition may be excellent in bending adhesion. Further, the coating layer may be excellent in durability even under high temperature and high humidity conditions.

According to an exemplary embodiment of the present invention, a coating layer may be formed on a substrate by applying the photocurable composition onto the substrate, and photocuring the photocurable composition. That is, the coating layer may be provided on a substrate without a bonding film or a bonding agent.

According to an exemplary embodiment of the present invention, the photocurable composition can be cured by applying the photocurable composition onto one surface of the substrate and irradiating the photocurable composition with an amount of light of 1.0 J/cm$^2$ to 1.5 J/cm$^2$ using a UV lamp having a wavelength value of 300 nm to 400 nm.

According to an exemplary embodiment of the present invention, an Erichsen cupping value of the coating layer, measured in an atmosphere of 85° C., 85 RH %, for 72 hours in accordance with ISO 1520, may satisfy 10 mm or more. That is, a high temperature and high humidity bending adhesion strength of the coating layer can satisfy an Erichsen cupping value of 10 mm or more measured in accordance with ISO 1520.

Specifically, for measurement of the Erichsen cupping value of the coating layer, a film having a coating layer having a thickness of 15 μm formed on a polyethyleneterephthalate (PET) substrate is produced by applying a photocurable composition onto the PET substrate having a thickness of 23 μm and curing the photocurable composition. Moreover, a sample is produced by cutting the film into a size of 20 cm in width and 20 cm in length, and a coating layer of the sample is attached to an iron plate with 20 cm in width, 20 cm in length, and 0.5 mm in thickness by using a thermosetting hydrophobic bonding agent (manufactured by KCC Corporation), thereby producing a test sample. Thereafter, deformation in the form of a cup in which a center part is bent more than both ends is applied to the test sample by pressurizing the center part of the test sample in the direction of the coating layer in the iron plate at a punch speed of 1 mm/min to 3 mm/min using a cupping tester through a test method in accordance with ISO 1520. Thereafter, after the deformed sample is stored in an atmosphere of 85° C. and 85 RH % for 72 hours, a high temperature and high humidity bending adhesion strength of the coating layer can be measured by a method of confirming an Erichsen cupping value in which the PET substrate and the coating layer of the sample do not fall off by cross-cutting the PET substrate of the sample. In this case, the Erichsen cupping value may mean a height of the bent center portion of the test sample with respect to a parallel line connecting both ends of the test sample. In addition, as the cupping tester, a BYK mechanical cupping tester or TQC SP4400 may be used, and a test of measuring a high temperature and high humidity bending adhesion strength of the coating layer may be performed by using a polyvinyl chloride (PVC) sheet having a thickness of 5 mm instead of the iron plate having a thickness of 0.5 mm.

According to an exemplary embodiment of the present invention, for the high temperature and high humidity bending adhesion strength of the coating layer, an Erichsen cupping value in accordance with ISO 1520 may be 10 mm or more. Specifically, by using the above-described method, the test sample including the coating layer is deformed into a cup shape having an Erichsen cupping value of 10 mm or more, and then an adhesion strength can be maintained while the coating layer and the PET substrate included in the test sample do not fall off from each other, even though the deformed test sample is stored in an atmosphere of 85° C. and 85 RH % for 72 hours, and then cross-cut.

Accordingly, according to an exemplary embodiment of the present invention, a coating layer including a cured product of the photocurable composition may be excellent in high temperature and high humidity bending adhesion strength to a substrate.

According to an exemplary embodiment of the present invention, the coating layer may be a decorative layer for a deco film. That is, an exemplary embodiment of the present invention provides a deco film including: a substrate; and a coating layer including a cured product of the photocurable composition provided on the substrate.

According to an exemplary embodiment of the present invention, the deco film can maintain the form thereof for a long period of time even after being attached to an article having curved shapes. Specifically, after the deco film is attached to an article having curved shapes, the coating layer of the deco film may not be peeled off from the substrate even after a long period of time elapses.

According to an exemplary embodiment of the present invention, the deco film can maintain the form thereof even under high temperature and high humidity conditions. Specifically, even though the deco film is attached to an article, and then is left to stand under high temperature and high humidity conditions, the coating layer of the deco film may not be peeled off from the substrate.

A photocurable composition forming a coating layer of the deco film according to an example of the present invention is the same as the photocurable composition according to an Example of the present invention.

According to an exemplary embodiment of the present invention, a deco film including a coating layer provided on one surface of a substrate can be produced by applying the photocurable composition onto the one surface of the substrate and photocuring the photocurable composition. As a method for applying the photocurable composition on one surface of a substrate, a publicly-known process may be used. Specifically, it is possible to use an inkjet printing process, a dispensing process, a silk screen process, a spray coating process, a spin coating process, a knife coating process, a dip coater coating process, a Meyer bar coating process, a gravure coating process, an offset coating process, a gravure offset coating process, a roll-to-roll offset coating process, a micro gravure coating process, and the like.

According to an exemplary embodiment of the present invention, the substrate is an optically transparent substrate, and may have a light transmittance of 90% or more. As an example, the substrate may include at least one of glass, polyethylene, polyethylene terephthalate, polyether ether ketone, polycarbonate, polyvinyl alcohol, polyolefin, polymethacrylate, and polyethylene naphthalate.

According to an exemplary embodiment of the present invention, the substrate may have a thickness of 20 μm to 50 μm. A deco film including a substrate having a thickness within the above-described range may be excellent in durability.

According to an exemplary embodiment of the present invention, a deco film having a coating layer provided on one surface of a substrate in the form of a sheet can be produced by applying a photocurable composition onto the substrate and photocuring the photocurable composition. Further, a deco film can be produced by continuously applying the photocurable composition onto a substrate elongated in a longitudinal direction using a roll-to-roll method, and curing the photocurable composition.

According to an exemplary embodiment of the present invention, the coating layer included in the deco film may be a decorative layer. Specifically, after the photocurable composition is applied onto one surface of the substrate and various decorative patterns are formed on the photocurable composition, a deco film including a coating layer having a decorative pattern formed can be easily produced by curing the photocurable composition. As an example, a deco film including a coating layer having a hairline pattern formed can be produced by offset coating the photocurable composition onto one surface of a substrate moving along the longitudinal direction using the roll-to-roll method and curing the photocurable composition. Furthermore, metal sensibility may also be implemented on the deco film by depositing tin (Sn) and/or depositing aluminum (Al) onto a coating layer having a hairline pattern formed.

According to an exemplary embodiment of the present invention, the coating layer may have a thickness of 10 μm to 20 μm. A deco film including a coating layer having a thickness within the above-described range may be excellent in durability. Further, a deco film including the coating layer may be excellent in adhesion to an article having bent shapes.

Hereinafter, the present invention will be described in detail with reference to Examples for specifically describing the present invention. However, the Examples according to the present invention may be modified in various forms, and it is not interpreted that the scope of the present invention is limited to the Examples to be described below. The Examples of the present specification are provided for more completely explaining the present invention to a person with ordinary skill in the art.

Preparation Example 1: Production of Urethane Acrylamide Oligomer

A mixture was produced by introducing 450 g of isobornyl acrylate (IBOA, manufactured by Shin-Nakamura Co., Ltd.) as a monomer for adjusting viscosity, 386 g of isophorone diisocyanate (IPDI, manufactured by Evonik Corporation) as a diisocyanate-based compound, and 433 g of polyalkylene carbonate diol (T5650E, manufactured by Asahi Kasei Chemical Corporation) as a polycarbonate diol into a 2 L five-necked reactor. The T5650E was found to have a number average molecular weight of about 500 g/mol.

Subsequently, after the mixture was heated to 50° C. and maintained at the temperature, a first urethane prepolymer represented by IPDI-(T5650E-IPDI)$_4$ was produced by introducing 40 ppm of dibutyltin dilaurate (DBTDL) as a catalyst thereinto and inducing an exothermic reaction. The produced first urethane prepolymer was found to have a weight average molecular weight of about 2,800 g/mol and viscosity of about 8,100 cPs measured by a Brookfield viscometer using a No. 52 spindle at a temperature of 25° C. and a rotation speed of 10 rpm.

Subsequently, a urethane acrylamide oligomer represented by HEAA-IPDI-(T5650E-IPDI)$_4$-HEAA was produced by adding dropwise 230 g of hydroxyl ethyl acrylamide (HEAA, manufactured by Kohjin chemical Co., Ltd.) as a polar group-containing acrylamide to the produced first urethane prepolymer and reacting the resulting mixture at 60° C. and a rate of 10 g/min. The produced urethane acrylamide oligomer was found to have a weight average molecular weight of about 3,100 g/mol and viscosity of about 13,000 cPs measured by a Brookfield viscometer using a No. 52 spindle at a temperature of 25° C. and a rotation speed of 10 rpm.

Preparation Example 2: Production of Urethane Acrylate Oligomer

A mixture was produced by introducing 450 g of isobornyl acrylate (IBOA, manufactured by Shin-Nakamura Co., Ltd.) as a monomer for adjusting viscosity, 168 g of isophorone diisocyanate (IPDI, manufactured by Evonik Corporation) as a diisocyanate-based compound, and 758 g of polyalkylene carbonate diol (T5652, manufactured by Asahi Kasei Chemical Corporation) as a polycarbonate diol into a 2 L five-necked reactor. The T5652 was found to have a number average molecular weight of about 2,000 g/mol.

Subsequently, after the mixture was heated to 60° C. and maintained at the temperature, a second urethane prepolymer represented by IPDI-(T5652-IPDI)$_5$ was produced by introducing 40 ppm of dibutyltin dilaurate (DBTDL) as a catalyst thereinto and inducing an exothermic reaction. The produced second urethane prepolymer was found to have a weight average molecular weight of about 10,000 g/mol and viscosity of about 50,000 cPs measured by a Brookfield viscometer using a No. 52 spindle at a temperature of 25° C. and a rotation speed of 10 rpm.

Subsequently, a urethane acrylate oligomer represented by HEMA-IPDI-(T5652-IPDI)$_5$-HEMA was produced by adding dropwise 123 g of hydroxyl ethyl methacrylate (HEMA, manufactured by Nippon Shokubai Co., Ltd.) as a polar group-containing (meth)acrylate to the produced second urethane prepolymer and reacting the resulting mixture at 60° C. The produced urethane acrylate oligomer was found to have a weight average molecular weight of about 12,800 g/mol and viscosity of 65,000 cPs measured by a Brookfield viscometer using a No. 52 spindle at a temperature of 25° C. and a rotation speed of 10 rpm.

Preparation Example 3: Production of Amide Group-Containing Acrylic Polymer 1440 g of dimethylacrylamide (DMAA, manufactured by Kohjin chemical Co., Ltd.) as an acrylamide, 160 g of hydroxyl ethyl methacrylate (HEMA, manufactured by Nippon Shokubai Co., Ltd.) as a polar group-containing (meth)acrylate, and 4.8 g of normal dodecane thiol (n-DDM, manufactured by Atofina Chemicals) were introduced into a 2 L 5-necked reactor, and the resulting mixture was heated to 60° C. and maintained at the same temperature while being purged with nitrogen for 1 hour. Thereafter, an amide group-containing acrylic polymer was produced by adding dropwise 20 ppm of 2,2'-azo-bisisobutyronitrile (AIBN) as an azo-based thermal initiator thereto at the same temperature. The produced amide group-containing acrylic polymer was found to have a weight average molecular weight of about 7,000 g/mol and viscosity of about 900 cPs measured by a Brookfield viscometer using a No. 52 spindle at a temperature of 25° C. and a rotation speed of 20 rpm.

Production of Photocurable Composition

Example 1

Pentaerythritol tri/tetraacrylate (M340, manufactured by Miwon Specialty Chemical Co., Ltd.) and tripropylene glycol diacrylate (M220, manufactured by Miwon Specialty Chemical Co., Ltd.) were prepared as monomers for adjusting viscosity, HP-8 (manufactured by Miwon Specialty Chemical Co., Ltd.) was prepared as a photoinitiator, and KBM403 (manufactured by Shin-Etsu Chemical Co., Ltd.) was prepared as another additive. Thereafter, a photocurable composition was produced by mixing the urethane acrylamide oligomer prepared in Preparation Example 1, the urethane acrylate oligomer prepared in Preparation Example 2, and the amide group-containing acrylic polymer prepared in Preparation Example 3 with the monomers for adjusting viscosity, the photoinitiator, and the additive.

With respect to 100 parts by weight of the photocurable composition, the content of the urethane acrylamide oligomer was 30 parts by weight, the content of the urethane acrylate oligomer was 30 parts by weight, the content of the amide group-containing acrylic polymer was 5 parts by weight, the content of M340 was 5 parts by weight, the content of M220 was 25 parts by weight, the content of the photoinitiator was 4.5 parts by weight, and the content of the additive was 0.5 part by weight. The viscosity of the photocurable composition, measured by a Brookfield viscometer using a No. 52 spindle at a temperature of 25° C. and a rotation speed of 10 rpm, was 620 cPs.

Examples 2 to 3

Photocurable compositions having the composition as in the following Table 1 were produced by using the same materials as those in Example 1.

Comparative Examples 1 to 4

Photocurable compositions having the composition as in the following Table 1 were produced by using the same materials as those in Example 1.

TABLE 1

|  | Example 1 | Example 2 | Example 3 | Comparative Example 1 | Comparative Example 2 | Comparative Example 3 | Comparative Example 4 |
|---|---|---|---|---|---|---|---|
| Urethane acrylamide oligomer (parts by weight) | 30 | 50 | 10 | 32.5 | 60 | — | 30 |
| Urethane acrylate oligomer (parts by weight) | 30 | 10 | 50 | 32.5 | — | 60 | 20 |
| Amide group-containing acrylic polymer (parts by weight) | 5 | 5 | 5 | — | 5 | 5 | 10 |
| M340 (parts by weight) | 5 | 5 | 5 | 5 | 5 | 5 | 5 |
| M220 (parts by weight) | 25 | 25 | 25 | 25 | 25 | 25 | 25 |

TABLE 1-continued

|  | Example 1 | Example 2 | Example 3 | Comparative Example 1 | Comparative Example 2 | Comparative Example 3 | Comparative Example 4 |
|---|---|---|---|---|---|---|---|
| HP-8 (parts by weight) | 4.5 | 4.5 | 4.5 | 4.5 | 4.5 | 4.5 | 4.5 |
| KBM403 (parts by weight) | 0.5 | 0.5 | 0.5 | 0.5 | 0.5 | 0.5 | 0.5 |
| Viscosity (cPs) | 620 | 300 | 1,250 | 820 | 430 | 1,550 | 501 |

Production of Deco Film

Each of the photocurable compositions produced in Examples 1 to 3 and Comparative Examples 1 to 4 was applied with a thickness of about 15 μm onto a polyethylene terephthalate (PET) substrate having a thickness of 23 μm. Thereafter, a deco film having a coating layer having a thickness of about 15 μm formed on one surface of the PET substrate was produced by irradiating the photocurable composition with an amount of light of about 1.2 J/cm² using a UV lamp having a wavelength value of 340 nm to cure the photocurable composition.

Experiment of Physical Properties of Deco Film

Room Temperature Adhesion Experiment

Samples were produced by cutting deco films including cured products of the photocurable compositions produced in Examples 1 to 3 and Comparative Examples 1 to 4 into 20 cm in width and 20 cm in length. Thereafter, after the samples were stored at a room temperature of 25° C. for 72 hours and left to stand at room temperature for 30 minutes, a room temperature adhesion experiment of the deco film was performed by a cross-cut method of marking 100 lattices on the surface of the coating layer of the sample using a crosscutter as a cutting guide in accordance with ASTM D3359, and then removing the lattices with the Nichiban tape.

The room temperature adhesion experimental results are shown in the following Table 2. In the following Table 2, 5B means that the coating layer of the deco film is excellent in adhesion to a substrate, and 0B means that the coating layer of the deco film is poor in adhesion to a substrate. Specifically, a case where the area in which the lattices were removed was 0% was evaluated as 5B, a case where the area in which the lattices were removed was more than 0% and less than 5% was evaluated as 4B, a case where the area in which the lattices were removed was 5% or more and less than 15% was evaluated as 3B, a case where the area in which the lattices were removed was 15% or more and less than 35% was evaluated as 2B, a case where the area in which the lattices were removed was 35% or more and less than 65% was evaluated as 1B, and a case where the area in which the lattices were removed was 65% or more was evaluated as 0B, and the evaluation as 0B may mean that the adhesion of the coating layer to the substrate is not exhibited at all.

High Temperature Adhesion Experiment

Samples were produced by cutting deco films including cured products of the photocurable compositions produced in Examples 1 to 3 and Comparative Examples 1 to 4 into 20 cm in width and 20 cm in length. Thereafter, after the samples were stored under 85° C. and 85 RH % wet heat conditions for 72 hours and left to stand at room temperature for 30 minutes, a high temperature adhesion experiment of the deco films was performed through the same cross-cut method as in the room temperature adhesion experiment.

The high temperature adhesion experimental results are shown in the following Table 2. In the following Table 2, 5B means that the adhesion of the coating layer of the deco film to the substrate is excellent and 0B means that the adhesion of the coating layer of the deco film to the substrate is poor, and the evaluation as 0B to 5B was performed by the same evaluation method as in the room temperature adhesion experiment.

Room Temperature Bending Adhesion Experiment

Samples were produced by cutting deco films including cured products of the photocurable compositions produced in Examples 1 to 3 and Comparative Examples 1 to 4 into 20 cm in width and 20 cm in length. Thereafter, a room temperature bending adhesion experiment of the deco film was performed by the method as follows.

A test sample was produced by attaching a PET substrate of the prepared deco film sample to an iron plate with 20 cm in width, 20 cm in length, and 0.5 mm in thickness. Thereafter, by using a cupping tester (TQC SP4400) based on DIN EN ISO 1520, the center portion of the test sample was pressurized in a direction from the iron plate to the coating layer at a punch speed of 2 mm/min. Until the test sample was deformed into a cup shape having a height of 10 mm, the center portion of the test sample was pressurized.

Thereafter, after the test sample deformed into the cup shape was stored at a room temperature of 25° C. for 72 hours, a room temperature bending adhesion experiment of the deco film was performed by the same cross-cut method as in the room temperature adhesion experiment.

The room temperature bending adhesion experimental results are shown in the following Table 2. In the following Table 2, 5B means that the adhesion of the coating layer of the deco film to the substrate is excellent and 0B means that the adhesion of the coating layer of the deco film to the substrate is poor, and the evaluation as 0B to 5B was performed by the same evaluation method as in the room temperature adhesion experiment.

High Temperature Bending Adhesion Experiment

Samples were produced by cutting deco films including cured products of the photocurable compositions produced in Examples 1 to 3 and Comparative Examples 1 to 4 into 20 cm in width and 20 cm in length. Thereafter, a high temperature bending adhesion experiment of the deco film was performed by the method as follows.

A test sample was produced by preparing an iron plate with 20 cm in width, 20 cm in length, and 0.5 mm in thickness, and attaching the coating layer of the sample to the iron plate using a thermosetting hydrophobic bonding agent (manufactured by KCC Corporation). Thereafter, by using a cupping tester (TQC SP4400) in accordance with ISO 1520, the center portion of the test sample was pressurized in a direction from the iron plate to the coating layer at a punch speed of 2 mm/min. Until the test sample was deformed into a cup shape having a predetermined height, the center portion of the test sample was pressurized.

Thereafter, after the test sample deformed into a cup shape was stored under 75° C. and 85 RH % conditions for 72 hours, the experiment was performed by a method of cross-cutting the coating layer of the sample and confirming whether the coating layer of the deco film fell off together with the PET substrate. In this case, a high temperature bending adhesion experiment was performed by varying the height (Erichsen cupping value) of the cup shape of the test sample, and the experiment was repeatedly performed in order to find a height where the coating layer of the deco film was peeled off from the PET substrate.

The high temperature bending adhesion experimental results are shown in the following Table 2. The Erichsen cupping value in the following Table 2 means a height in which the Erichsen test sample is deformed before the coating layer of the deco film is peeled off from the PET substrate as the high temperature bending adhesion experiment is performed.

2T Bending Adhesion Experiment

Samples were produced by cutting deco films including cured products of the photocurable compositions produced in Examples 1 to 3 and Comparative Examples 1 to 4 into 20 cm in width and 5 cm in length.

Figure 1:
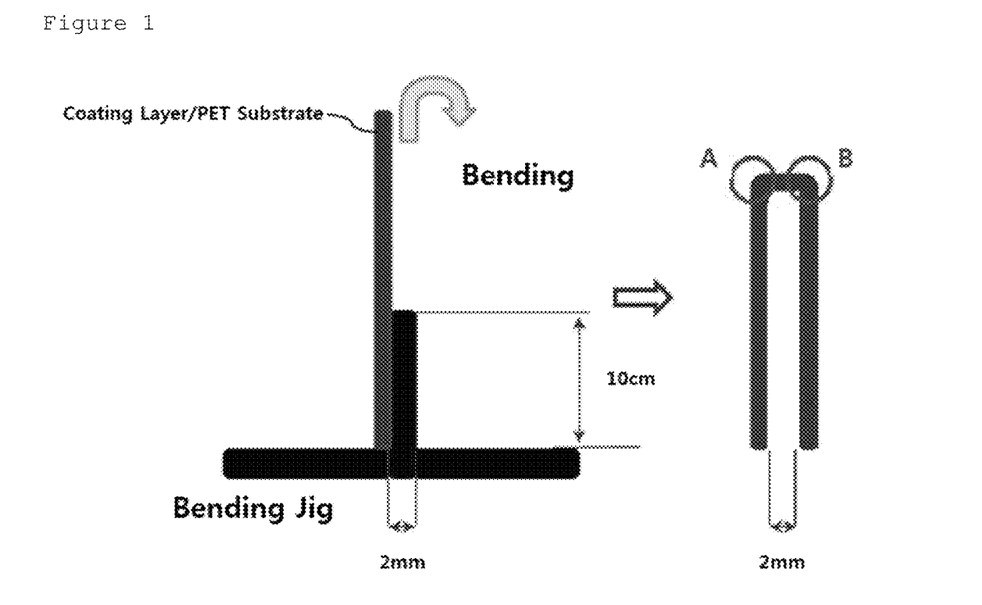
FIG. 1 is a schematic view illustrating a 2T bending adhesion experimental method of coating layers including cured products of the photocurable compositions produced in Examples 1 to 3 and Comparative Examples 1 to 4 of the present application.

FIG. 1 is a schematic view illustrating a 2T bending adhesion experimental method of coating layers including cured products of the photocurable compositions produced in Examples 1 to 3 and Comparative Examples 1 to 4 of the present application.

As in the method illustrated in FIG. 1, a 2T bending adhesion experiment of coating layers including cured products of the photocurable compositions produced in Examples 1 to 3 and Comparative Examples 1 to 4 of the present invention was performed. Specifically, when a PET substrate having a thickness of 15 μm including a coating layer having a thickness of 15 μm was bent at an interval of 2 T (2 mm) as illustrated in FIG. 1, a case where in the (A) and (B) portions marked in FIG. 1, the coating layer was not peeled off from the PET substrate, or bursting did not occur in the coating layer was evaluated as good, a case where the coating layer was peeled off, or the bursting occurred was evaluated as insufficient, and the results are shown in the following Table 2.

Q-UV Experiment

Samples were produced by cutting deco films including cured products of the photocurable compositions produced in Examples 1 to 3 and Comparative Examples 1 to 4 into 10 cm in width and 10 cm in length. Thereafter, the change in color difference of the coating layer was measured by irradiating the coating layer of the deco film with Q-UV (UV340, manufactured by Q-lab Corporation) for 72 hours, and using a CM5 spectrophotometer (manufactured by Konica Minolta, Inc.). The change in color difference of the coating layer can be measured through a ΔE value which is a degree to which the color of the coating layer is changed after 72 hours as compared to the initial color of the coating layer, and the results thereof are shown in the following Table 2.

Tensile Strength and Toughness Experiment

After each of the photocurable compositions prepared in Examples 1 to 3 and Comparative Examples 1 to 4 was applied onto a release film and another release film was stacked on the photocurable composition, a coating layer having a thickness of 15 μm was formed by irradiating the photocurable composition with an amount of light of about 1.5 J/cm$^2$ using a UV lamp having a wavelength value of 340 nm. Thereafter, a sample was produced by removing the two release films from the coating layer and cutting the coating layer into 12 cm in width and 2.54 cm in length. Thereafter, the tensile strength and toughness of the sample at break were measured while pulling the sample at a rate of 300 mm/min using a TA apparatus, and the results are shown in the following Table 2.

TABLE 2

|  | Example 1 | Example 2 | Example 3 | Comparative Example 1 | Comparative Example 2 | Comparative Example 3 | Comparative Example 4 |
|---|---|---|---|---|---|---|---|
| Room temperature adhesion | 5B | 5B | 5B | 5B | 5B | 3B | 5B |
| High temperature adhesion | 5B | 5B | 5B | 5B | 5B | 4B | 5B |
| Room temperature bending adhesion | 5B | 5B | 5B | 4B | 2B | 5B | 4B |
| High temperature adhesion (Erichsen cupping value, mm) | 11.5 (good) | 10.9 (good) | 11 (good) | 6 (insufficient) | 4 (insufficient) | 3 (insufficient) | 6.2 (insufficient) |
| 2T Bending Adhesion | good | good | good | good | insufficient | good | insufficient |
| Q-UV result (ΔE) | 0.45 | 0.51 | 0.33 | 0.21 | 0.71 | 0.37 | 1.11 (insufficient) |
| Tensile strength (gf) | 1820 | 1620 | 1364 | 1050 | 1400 | 900 | 2100 |
| Toughness (gf*mm) | 3163 | 6236 | 11500 | 2320 | 819 | 2130 | 950 |

Referring to Table 2, it could be confirmed that even when the deco films according to Examples 1 to 3 of the present invention had an Erichsen cupping value of 10 mm or more, the coating layer was attached to the substrate without falling off from each other. In contrast, it could be confirmed that even when the deco films according to Comparative Examples 1 to 4 had an Erichsen cupping value of 10 mm or less, the coating layer was peeled off from the substrate. Accordingly, it can be confirmed that the deco film according to an exemplary embodiment of the present invention is excellent in bending adhesion and is excellent in adhesion even under high temperature and high humidity conditions.

Figure 2A:
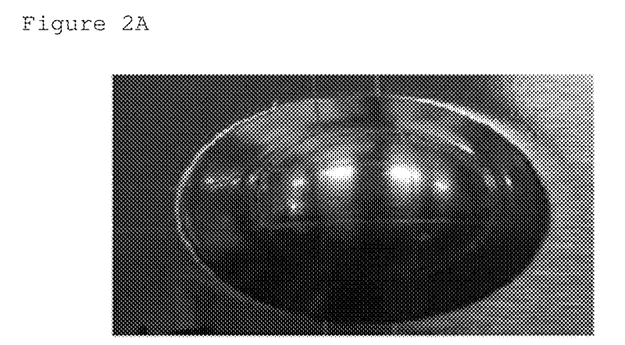
FIG. 2A is a captured photograph of the deco film according to Example 1 of the present application which is subjected to a high temperature bending adhesion experiment.
Figure 2B:
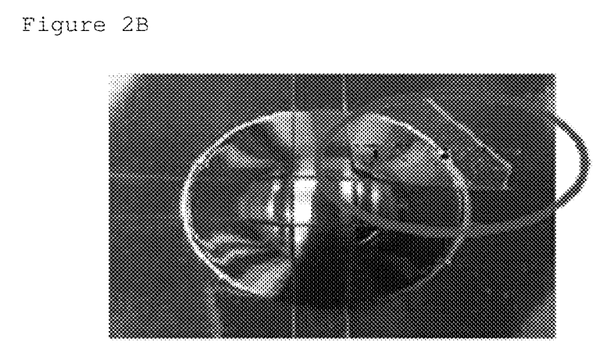
FIG. 2B is a captured photograph of the deco film according to Comparative Example 2 which is subjected to a high temperature bending adhesion experiment.

FIG. 2A is a captured photograph of the deco film according to Example 1 of the present application which is subjected to a high temperature bending adhesion experiment, and FIG. 2B is a captured photograph of the deco film according to Comparative Example 2 which is subjected to a high temperature bending adhesion experiment. Specifically, FIGS. 2A and 2B are captured photographs of the deco film when the Ericsson cupping value is 10 mm which is subjected to a high temperature bending adhesion experiment of the deco film.

Referring to FIG. 2A, it could be confirmed that when the deco film according to Example 1 of the present invention had an Erichsen cupping value of 10 mm, the coating layer was attached to the substrate. In contrast, referring to FIG. 2B, it could be confirmed that when the deco film according to Comparative Example 2 had an Erichsen cupping value of 10 mm, the coating layer fell off from the substrate.

In addition, referring to Table 2, it could be confirmed that the deco films according to Examples 1 to 3 of the present invention possessed excellent toughness as compared to the deco films according to Comparative Examples 1 to 4. That is, it could be confirmed that the deco film according to the Examples of the present invention possessed high elongations. Accordingly, according to an exemplary embodiment of the present invention, the deco film may possess high toughness and elongation, so that the adhesion to the article having curved shapes may be excellent in adhesion.

Furthermore, referring to Table 2, it could be confirmed that the deco films according to Examples 1 to 3 of the present invention generally had excellent adhesion at room temperature and high temperature.

The invention claimed is:

1. A photocurable composition comprising:
   a urethane acrylamide oligomer derived from a first urethane prepolymer having an isocyanate end group and a polar group-containing acrylamide;
   a urethane acrylate oligomer derived from a second urethane prepolymer having an isocyanate end group and a polar group-containing (meth)acrylate; and
   an amide group-containing acrylic polymer derived from an acrylamide and a polar group-containing (meth)acrylate, wherein a content of the amide group-containing acrylic polymer is 2 parts by weight or more and 9 parts by weight or less with respect to 100 parts by weight of the photocurable composition.

2. The photocurable composition of claim 1, wherein the first urethane prepolymer is represented by the following Formula 1:

$$\text{OCN-A}(\text{-B}_1\text{-A-})_n\text{NCO} \quad \text{[Formula 1]}$$

wherein,
A is derived from a diisocyanate-based compound,
$B_1$ is derived from a polycarbonate diol having a number average molecular weight of 200 g/mol to 700 g/mol, and
n is an integer from 1 to 10.

3. The photocurable composition of claim 1, wherein the second urethane prepolymer is represented by the following Formula 2:

$$\text{OCN-A}(\text{-B}_2\text{-A-})_n\text{NCO} \quad \text{[Formula 2]}$$

wherein,
A is derived from a diisocyanate-based compound,
$B_2$ is derived from a polycarbonate diol having a number average molecular weight of 1,000 g/mol to 3,000 g/mol, and
n is an integer from 3 to 10.

4. The photocurable composition of claim 1, wherein a content of the urethane acrylamide oligomer is 10 parts by weight or more and 50 parts by weight or less with respect to 100 parts by weight of the photocurable composition.

5. The photocurable composition of claim 1, wherein a content of the urethane acrylate oligomer is 10 parts by weight or more and 50 parts by weight or less with respect to 100 parts by weight of the photocurable composition.

6. The photocurable composition of claim 1, wherein the urethane acrylamide oligomer has a weight average molecular weight of 2,000 g/mol or more and 5,000 g/mol or less.

7. The photocurable composition of claim 1, wherein the urethane acrylate oligomer has a weight average molecular weight of 10,000 g/mol or more and 15,000 g/mol or less.

8. The photocurable composition of claim 1, wherein the amide group-containing acrylic polymer has a weight average molecular weight of 5,000 g/mol or more and 10,000 g/mol or less.

9. The photocurable composition of claim 1, further comprising an additive comprising at least one of a monomer for adjusting viscosity or a photoinitiator.

10. The photocurable composition of claim 9, wherein a content of the monomer for adjusting viscosity is 20 parts by weight or more and 40 parts by weight or less with respect to 100 parts by weight of the photocurable composition.

11. A coating layer comprising a cured product of the photocurable composition according to claim 1.

12. The coating layer of claim 11, wherein an Erichsen cupping value of the coating layer, measured in an atmosphere of 85° C., 85 RH % for 72 hours in accordance with ISO 1520, is 10 mm or more.

13. The coating layer of claim 11, wherein the coating layer is a decorative layer for a deco film.

* * * * *